United States Patent Office 3,135,075
Patented June 2, 1964

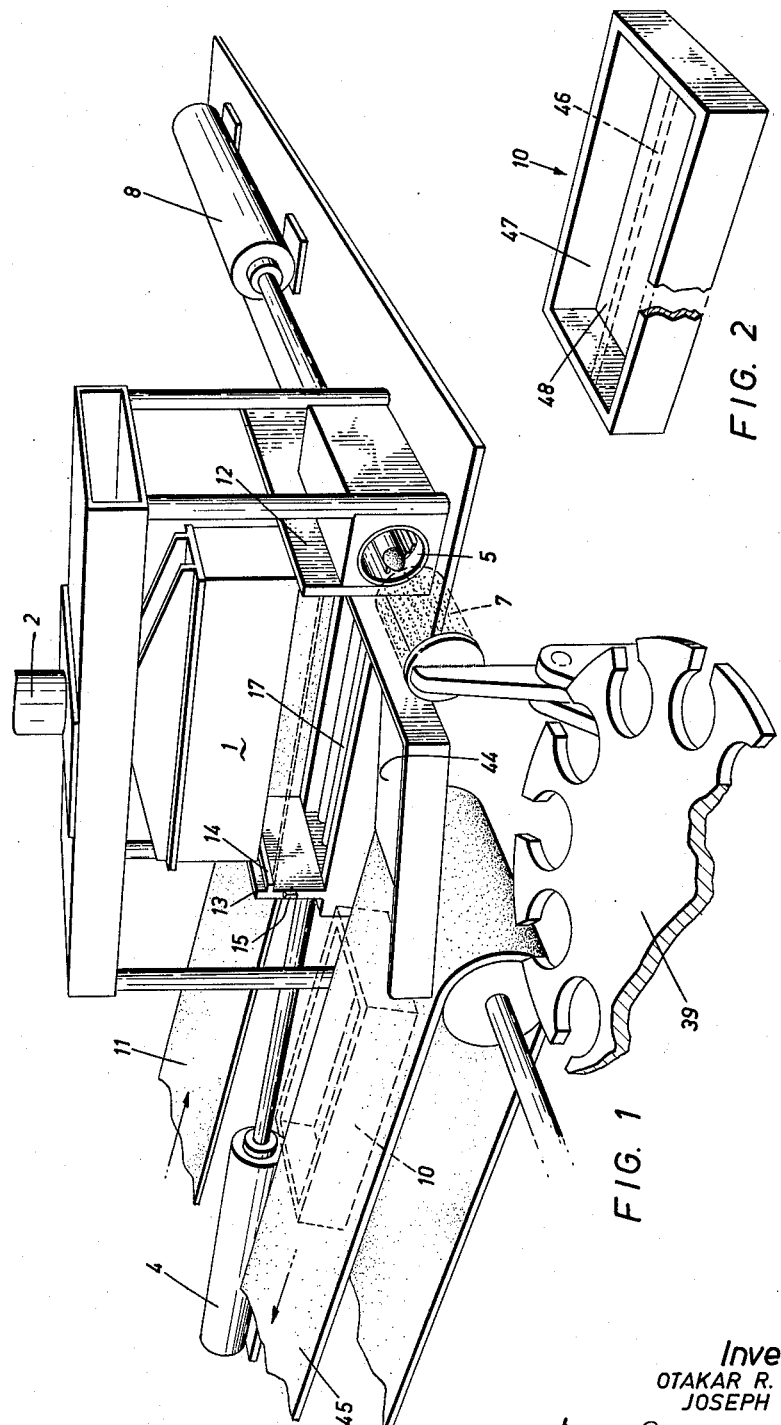

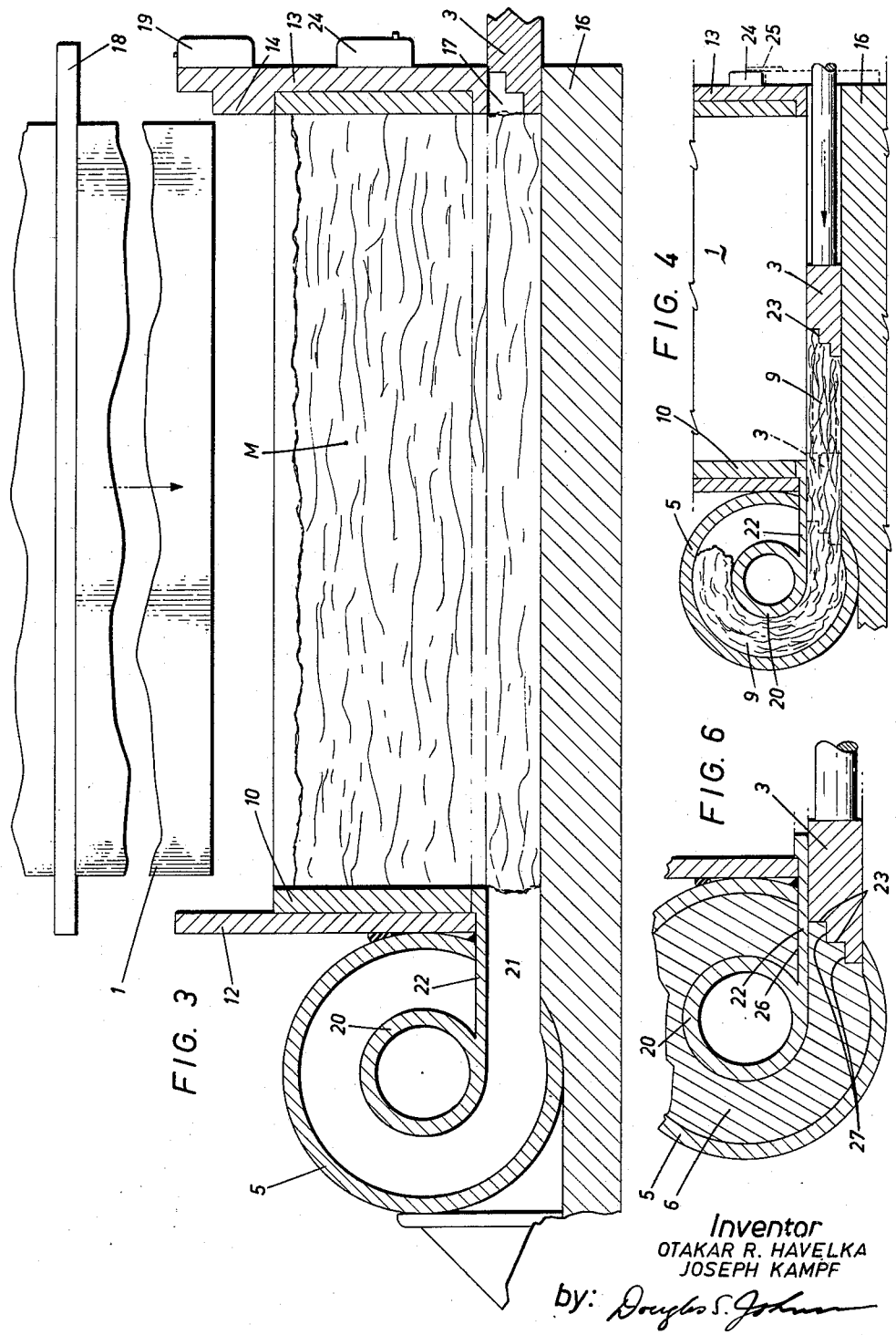

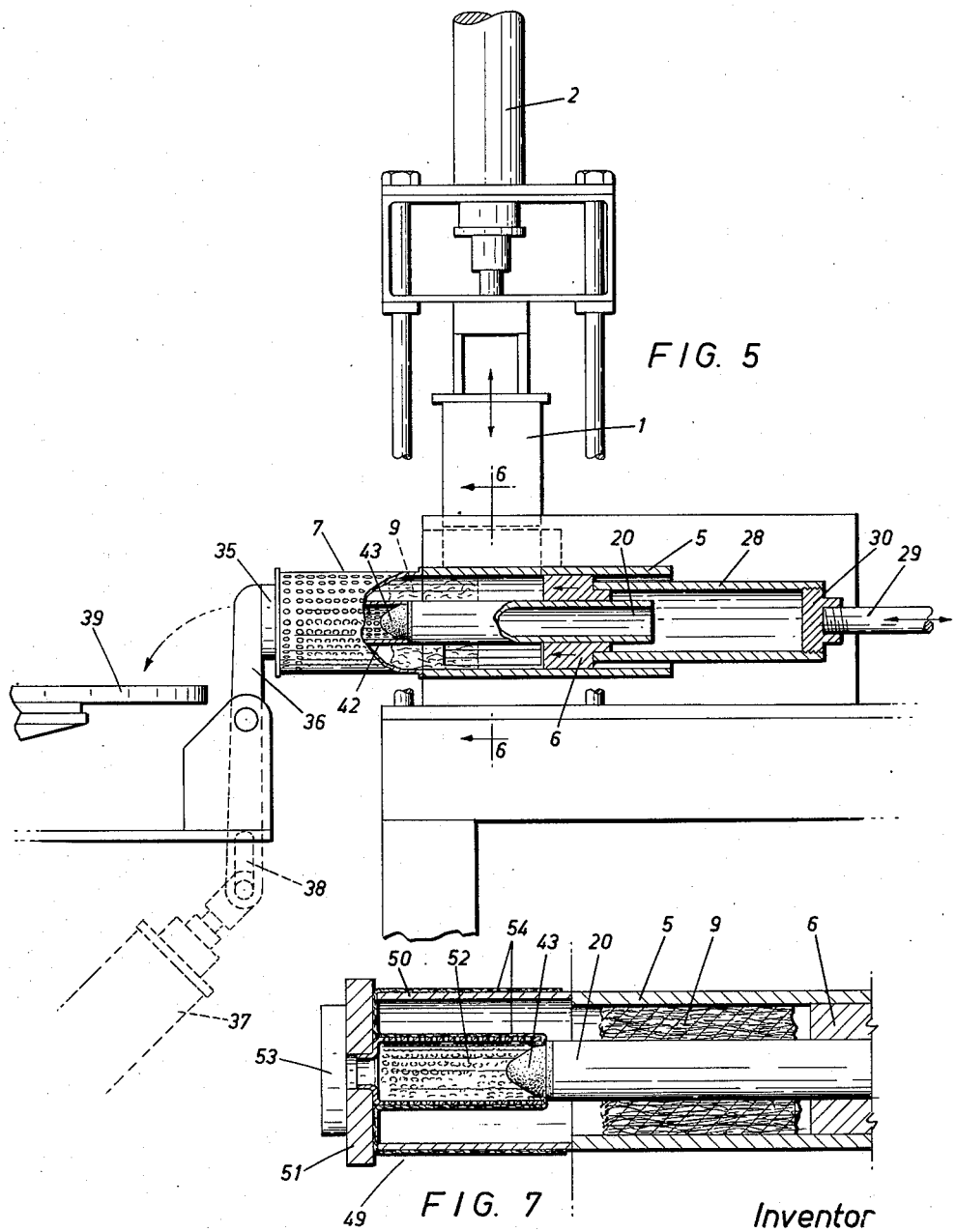

3,135,075
METHOD AND APPARATUS FOR PRODUCING FILTER CARTRIDGES AND THE LIKE
Otakar R. Havelka and Joseph Kampf, Preston, Ontario, Canada, assignors to Kralinator Filters Limited, Preston, Ontario, Canada
Filed Apr. 10, 1961, Ser. No. 101,737
11 Claims. (Cl. 53—13)

This invention relates to improvements in the manufacture of filter cartridges of the type used in filtering dirt, sludge or other waste from the oil or lubricant of circulating lubricating systems and comprising a tubular length or sleeve of a compressed fibrous filter medium within a suitable jacket, such as a can, cylinder, sock or the like.

The object of the invention is to provide an improved method and apparatus for forming such filter cartridges or elements which method and apparatus will greatly increase the speed of production and will ensure that the filtering media at all times will be uniformly compacted.

Another important object is to provide an improved method and apparatus as aforesaid which will enable the efficient production of filters of uniform excellence of quality to be produced by relatively untrained personnel with complete safety. In this connection it is more specifically an object to provide an improved method and apparatus as aforesaid which will enable the actual compression of the filtering media and its placement in the can, cylinder or other jacket to be carried out entirely automatically with a rapid cycle operation.

Still another important object is to enable filters employing filtering bodies made up of sections of different filtering media to be produced with equal facility to those in which a single filtering material is used.

In the conventional manufacture of filter cartridges or the like, the filtering media is usually a fibrous media such as cotton waste, and this material is normally hand-fed in batches or handfuls into a suitable funnel or guide through which it is forced by means of a plunger or ram into the container or cartridge which is usually in the form of a can or cylinder. In the conventional method the skill of the worker is important in obtaining relatively uniform compaction of the filtering media throughout its length and even the best trained operators have difficulty in avoiding cavities or variations in the density of the filtering media so that the filter cartridge is susceptible to having low density or weak spots along its length. Moreover, even with the most experienced operators the forcing of the filter media into the container and its compaction is a slow tedious job and feeding the media by hand into the funnel is dangerous as the plunger or ram is moving through the funnel and even the best safety devices have sometimes failed.

Efforts have been made to overcome the conventional hand feed methods but to the present none of these methods have proven to be completely satisfactory as they have not been able to guarantee the required uniformity of compactness or density in the filtering media.

According to the present invention, the uniform density of the filtering media throughout its length and the incorporation of the filtering media in the appropriate cylinder or can is effected by first compressing a predetermined quantity of filtering material into a flat rectilinear mat, then forcing the compressed mat into cylindrical or tubular form, then transferring the compressed mat tube into a container or jacket while compressing the mat tube in an axial direction.

The forcing of the compressed mat into tubular form is effected through the application of pressure to one edge of the rectilinear mat in a direction perpendicular to the direction in which compaction of the mat was effected.

More generally therefore, according to the invention the filter body is formed and delivered to its container or jacket by the application of pressure in three mutually perpendicular directions; first in a direction to produce a flat rectilinear mat having a degree of structural stability; then in a perpendicular direction in the plane of the mat to force the mat into tubular form through the use of an appropriate guide, and then in a perpendicular direction axially of the tube to effect final filter body compression and transfer to an appropriate jacket.

According to the preferred form of the invention apparatus for carrying out the filter manufacture comprises a first hydraulic ram arranged to compress filtering media placed therebeneath into a mat which in its compressed form will have a measure of structural strength, a second hydraulic ram moving in a direction perpendicular to the first ram and in the plane of the compressed mat to force the mat edgewise as a sheet into a cored forming cylinder through an opening extending along the length of the cylinder and providing a path for the mat leading tangentially into the cylinder, the mat under the action of the second ram being both compressed edgewise and formed into a tube, and a third hydraulic ram moving in a direction perpendicular to the aforesaid hydraulic rams through the cored forming cylinder to compress the filter media tube in an axial direction and to transfer the compressed tube into its can, cylinder or jacket.

Further, according to the preferred form of the invention, the movement of the rams is synchronized by having the first ram trip a suitable switch as it reaches its point of maximum compression of the mat to initiate movement of the second ram, and by having the second ram arranged to trip a suitable switch when the mat is fully introduced into the cored forming cylinder to initiate the third ram to compress the mat tube and deliver it to its jacket, the arrangement being such that the three stages of filtering media compression are automatically carried out in sequence for a complete filter forming cycle without manual operation.

Another feature of the invention resides in employing a bottomless measuring box or frame for introducing the filtering media beneath the first ram. In this connection according to the preferred form of the invention the requisite amount of filter media is placed in the bottomless box or frame and the box placed beneath the first ram as located by suitable stops with the box preferably being arranged to trip a suitable switch when correctly located beneath the ram to initiate the machine cycle, the first ram moving through the box to compress the filtering media into a rectilinear mat in a well arranged below the box when beneath the first ram, and through which well the second ram operates across beneath the box in delivering the compressed mat into the cored forming cylinder.

Another important feature resides in supporting the core of the cored forming cylinder at least in part by means of a plate tangent to and extending lengthwise of the core, the plate forming a guide to ensure that the compressed mat which is delivered tangentially into the cylinder beneath the plate follows the requisite curving path around the core to ensure its cylindrical or tubular shape, the plate also forming a stop between which stop and the second ram the filtering media is compressed in the second compression stage.

Still another feature resides in forming the mat engaging face of the second ram with a stepped formation to eliminate lifting of the fibres of the mat edge engaged by the second ram as the mat is compressed and formed into tubular form.

According to the invention the filter body may be made up of two or more sections of different filtering media, and a further feature of the invention resides in providing the filter media receiving box or frame with one or more dividers whereby the requisite quantities of the separate filtering material can be introduced into the separate compartments formed in the box by the dividers after which the box is then placed under the first ram and the process and apparatus operated as before, it being understood that the first ram will be suitably shaped to accommodate the box dividers.

These and other objects and features will become readily apparent from the following detailed description taken in conjunction with the accompanying drawings, in which:

FIGURE 1 is a perspective view partly in diagrammatic form of apparatus for carrying out the manufacture of filter cartridges in accordance with the invention;

FIGURE 2 is a perspective view partly broken away of one type of filtering media measuring box for use with the apparatus of FIGURE 1;

FIGURE 3 is an enlarged vertical sectional view taken longitudinally through the filtering media measuring box located beneath the first ram and transversely of the cored forming cylinder associated with the second ram, the first ram being shown ready to descend to compress the material into a mat;

FIGURE 4 is a view similar to FIGURE 3 but showing the first ram in its lowermost position and the second ram partially advanced in the feed of the mat compressed by the first ram into the forming cylinder;

FIGURE 5 is a part elevational, part vertical sectional view taken longitudinally through the forming cylinder and showing the third ram in its retracted position in solid line and in dotted line axially compressing the mat tube and delivering same to its enclosing can;

FIGURE 6 is a fragmented vertical section on an enlarged scale on the lines 6—6 of FIGURE 5.

FIGURE 7 is a vertical sectional detail of an alternate form of container for receiving the tubular filtering material mat from the cored cylinder.

With reference to FIGURE 1, there is shown a suitable apparatus for carrying out the invention, and this apparatus comprises a first ram 1 operated by means of a hydraulic cylinder 2 arranged to travel vertically to compress a quantity of filtering material into a mat. A second ram 3 (FIGURES 3 and 4) actuated by a hydraulic cylinder 4, is arranged to move in a direction perpendicular to the ram 1 across beneath the ram in a horizontal plane to deliver the filtering mat into a cored forming cylinder generally designated at 5. A third ram 6 (FIGURE 5) operating through the cylinder 5 is arranged to compress the mat in the cylinder and deliver same to a suitable can or cylinder 7 or the like (FIGURES 5 or 7), the ram 6 moving in a horizontal plane perpendicular to the direction of the ram 3 and also perpendicular to the direction of the ram 1 under action of an hydraulic cylinder 8.

On following the sequence of steps in the compression of the filtering media, reference may be had first to FIGURE 3 where the filtering media M is shown in position to be compressed by the ram 1. In FIGURE 4 the filtering media is shown as having been compressed by the ram 1 into a mat 9 which mat is being delivered by the ram 3 into the cylinder 5 where it is shaped into a tube and compressed in a direction transversely of its thickness. FIGURE 5 shows the tubular mat 9 being compressed axially while being transferred to the can or cylinder 7.

Preparatory to the compression step, the filtering media may conveniently be placed in a bottomless box or frame 10 and conveniently the requisite amount of filtering media may be placed in the box 10 at a point remote from the ram 1 and the box containing the predetermined quantity of filtering media delivered to the input side of the apparatus of FIGURE 1 by means of a conveyor 11.

The box 10 is then delivered into the machine beneath the ram 1 being guided between the plates 12 and 13 and beneath the guide ledge 14 provided on the plate 13. When fully home, the box 10 may conveniently be arranged to trip a suitable microswitch or the like 15 to initiate operation of the hydraulic cylinder 2 to move the ram 1 downwardly.

The bed or plate 16 over which the box 10 is fed when positioned beneath the ram 1 provides a well 17 below the box so that the filtering material in the box drops down into the well, and as the ram 1 descends, it passes down through the box 10 to compress the filtering media into the mat 9 beneath the box as particularly shown in FIGURES 3 and 4. On reaching the bottom of the stroke a ledge 18 on the ram is arranged to strike a microswitch 19 which in turn is arranged to energize the hydraulic cylinder 4 of the ram 3.

As shown in FIGURES 3 and 4, the cored forming cylinder 5 is provided with a central core 20 and is formed along its length with an inlet passage 21. A plate or extension 22 is arranged as a tangent to the core 20 extends through the opening or inlet 21 and this plate 22, along with the opposing wall of the cylinder 5, forms a tangential path for the mat 9 to feed into the cylinder 5. Thus, when the microswitch is actuated, the ram 3 will apply force to the edge of the mat in a direction perpendicular to the direction in which it was compressed by the ram 1, and the mat will be forced into the cored forming cylinder 5 being constrained to follow a curved path to form the mat into a tubular form as shown in FIGURES 4 and 5.

The plate 22 not only serves as a guide means for ensuring that the movement of the mat 9 is constrained to a curved path, but it also forms a stop against which the edge of the mat remote from the ram 3 abuts and as the ram 3 continues on to its fully home position illustrated in broken line in FIGURE 4, it will be appreciated that the mat 9 will be compressed between the face of the ram and the plate 22 so that it will be compressed in effect in a direction perpendicular to its thickness while the outer wall of the core 20 and the inner wall of the cylinder 5 maintain constant mat thickness under such edgewise compression.

It will be appreciated, of course, that the dimension of the mat 9 as compressed by the ram 1 in the direction of travel of the ram 3 will be considerably greater than the mean diameter of the compressed tubular mat in order to obtain the second stage of compression. Preferably this mat dimension should be at least of the order of one-third greater than the means diameter of the compressed mat tube.

It will also be noted that the face of the ram 3 is provided with a series of steps 23 and these steps have been found to provide an important advantage in eliminating any lifting of the fibres at this point of the mat so that substantially uniform compression is effected throughout the trailing edge portion of the mat.

During the transfer of the mat into the cored cylinder 5, the ram 1 is maintained in its lowermost position so that the thickness of the mat is maintained as it is pushed from the side into the cylinder. Upon the ram 3 reaching the innermost end of its stroke, it may conveniently be arranged to operate a further microswitch 24 by means of a finger 25 to initiate operation of the hydraulic cylinder 8 of the ram 6.

As shown in FIGURE 6, the ram 6 is suitably slotted as at 26 to receive the guide plate 22 and notched as at 27 to receive the stepped end of the ram 3.

As shown in FIGURE 5, the ram 6 is supported by a tube 28 connected to the piston rod 29 of the cylinder 8 through an end fitting 30.

As the ram 6 advances, it compresses the tubular mat 9 in the cylinder 5 axially while at the same time forcing the mat axially out of the cylinder 5 and into the can or cylinder 7 arranged at the end of the cylinder 5.

While any mechanism may be utilized to support the can or cylinder 7 in position at the end of the cylinder 5 and move it towards and from the cylinder, the can is shown as mounted on an end plate 35 carried on a pivoted lever arm 36 actuated by a hydraulic cylinder 37 connected to the lever 36 through a pin and slot connection 38. The can or cylinder 7 may conveniently be releasably held on the plate 35 as for example by a suitable arrangement of magnets (not shown). The can or cylinder supporting and moving mechanism is arranged to co-operate with a suitable indexing turntable 39, for example, and the operation of the turntable 39 and hydraulic cylinder 37 may be suitably synchronized with the operaiton of the rams 1, 3 and 6 to pick up the required empty can or cylinder 7 from the turntable and deliver it to the end of the cylinder 5 for reception of the compressed tubular mat of filtering material which is delivered thereto as the final step in the cycle of the synchronized movement of the rams 1, 3 and 6. It will be understood of course that any other form of suitable mechanism for positioning the cans or cylinders 7 for receiving the compressed filter tube may be used as desired.

As shown in FIGURE 5, the can or cylinder 7 is provided with a central core 42 and the core 20 of the cylinder 5 may be conveniently formed with a yieldable nose 43 for centering the core 42 and hence the can or cylinder 7.

It will be understood, of course, that the axial dimension of the tubular mat formed by the ram 3 will be longer, e.g. approximately 20% longer, than the axial dimension of the receiving can or cylinder 7 whereby the transfer of the mat into the can or cylinder by the ram 6 will effect a substantial axial compression of the tubular mat.

Following the completion of the cycle of operation of the rams 1, 3 and 6, the box 10 may be pushed out of its station beneath the ram 1, as for example by the introduction of a second box beneath the ram 1, and the first box will be delivered onto a slide platform 44 from which it will slide downwardly onto a suitable conveyor 45 where it may be returned to the filling station.

While in many instances a single filtering material may be used in the filter cartridge or the like, there will also be occasions where the filter cartridge is required to be made up of different sections of different filtering media. To this end, as shown in FIGURE 2, a suitable divider 46 (shown in dotted lines) may be introduced into the box 10 and the one filtering medium may be placed in one of the compartments 47 formed at one side of the divider 46 and a different filtering medium may be placed in the compartment 48 formed at the opposite side of the divider. Further dividers may be employed if additional sections of different filtering material are required. When the dividers have been introduced into the box and the requisite predetermined amount of different filtering material introduced into the different compartments, the box may then be delivered beneath ram 1 as before. In this case, the ram 1 will be modified as required to receive the dividers 46 as it passes through the box to compress the filtering media into the mat 9 which, instead of being made up of a single material, will be a mat formed with a number of sections or strips of different filtering media, in side abutting relation.

The composite mat will then be delivered edgewise into the cored forming cylinder 5 as before and will be compressed axially and delivered out of the cylinder to the can or cylinder 7 as in the case of the mat formed of a single type of filtering material.

It is to be particularly noted that after the first compression step in which the ram 1 compresses the filtering material into a mat 9, whether made up of one type of filter material or several strips of different filter materials, the mat will have imparted to it a measure of structural unity or body due to the interengagement of the compacted fibres. This interlocking or welded fibrous mat is thus in a state in which it can be readily pushed as a unit by the rams 3 to travel as a sheet moving uniformly into the cored cylinder 5.

While the use of a travelling box 10 has been shown, it will be understood that a permanent measuring hopper, box or the like may be positioned beneath the ram and the raw filtering materials fed to the ram station and delivered in predetermined quantities into the hopper or box, it being understood that with such an installation suitable safety precautions will be taken to ensure that the ram 1 does not move through the box or hopper until the feed of the predetermined filtering material or materials has been completed.

In FIGURE 7 there is shown a modification in which the tubular filtering material mat 9 is delivered into a socket type cartridge generally designated at 49. In this case there is secured to the end of the cored forming cylinder 5 a cylinder 50 and the cartridge 49. A central perforated core 52 and a base plate 51 (where used) is supported on a backing plate 53 with its sock 54 of suitable knitted material sleeved on the central core 52.

The backing plate 53 may be operated by any suitable means to bring the cartridge case 52 into registering contact with the yieldable nose 43 of the cylinder core 20 and the sock 54 may then be sleeved over the fixed cylinder 50 whereby the cartridge is then in a position to receive the tube of filtering material 9 from the cylinder 5. In this case the ram 6 may conveniently be provided with a greater length of travel to not only deliver the tube of filtering material into the cartridge 49 and compress same axially but further, after completing such compression to effect stripping of the cartridge from the cylinder 50. It will be understood that the backing plate 53 will be held rigidly in position during the axial compression of the filtering material tube, but will be retracted in synchronization with the further stripping movement of the ram 6.

While we have described the preferred method of carrying out our invention and suitable apparatus for carrying out the said method, it will be understood that variations in the details of the apparatus and in the details of the steps of the process as particularly described herein may be made by those skilled in the art without departing from the spirit of the invention or scope of the appended claims.

What we claim as our invention is:

1. In the production of a filter cartridge or the like, the steps of compressing a predetermined quantity of fibrous filtering material in one direction while constraining the material to a rectilinear form to produce a flat compacted rectilinear mat, and while maintaining said pressure in said first direction pressing said mat from one edge in a second direction perpendicular to the first direction while constraining the mat to follow a curved path to curl the mat into a tubular form and constraining the mat from expanding in thickness while curling same, the edge of the mat opposite to the edge against which pressure is applied in said second direction being arranged to contact a stop upon completion of said tubular form and continuing pressure in said second direction with said mat in tubular form and said latter edge in contact with the stop to compress the tubular mat in a direction transversely of its thickness around its tubular form, then pressing the tubular mat in a third direction axially thereof and perpendicular to said first and second directions while constraining said mat to maintain said tubular form to transfer said tubular mat to a container and to compress said tubular mat axially.

2. A method as claimed in claim 1 in which said filtering material comprises at least two different fibrous materials.

3. A method as claimed in claim 1 in which said mat produced by pressure in said first direction comprises a rectilinear mat formed of at least two abutting strips of different filtering material.

4. Apparatus for use in forming filter cartridges or the like comprising a first pressure means for compressing a predetermined quantity of filtering material into a flat compacted mat, an open-ended cylinder having a central core and having an opening along its length, means forming with said opening an inlet path leading into said cylinder tangentially of said core, a second pressure means for delivering a flat compacted mat compressed by said first pressure means into said cored cylinder through said opening to curl said mat into a tube and a third pressure means for delivering a tubular mat axially out of said cylinder, compressing the tubular mat in an axial direction said first, second and third pressure means being automatically operated and synchronized to act sequentially to automatically form, deliver and compress the tubular mat.

5. Apparatus for use in forming filter cartridges or the like comprising a first ram receptacle means for receiving a predetermined quantity of filtering material disposed in the path of said first ram, means for actuating said first ram to move same through said receptacle means to compress filtering material contained therein into a flat compacted mat, an open-ended cylinder containing a core having an opening along the length thereof disposed to register with the mat produced by said first ram, guide means extending from the said opening to said core substantially as a tangent to said core, a second ram disposed opposite to and movable towards and from said cylinder in a direction perpendicular to said first ram to engage a flat compacted mat compressed by said first ram at the edge opposite to said cylinder, means for actuating said second ram to deliver a flat compacted mat through said cylinder opening and curl same around said core as guided by said guide means to form a tubular mat with the edge of the mat opposite to the edge engaged by said second ram contacting said guide substantially on completion of its tubular form, said second ram being movable to close said cylinder opening and to compress the tubular mat between said guide means and second ram with said cored cylinder maintaining the tubular mat against expanding in thickness, a third ram movable axially through said cored cylinder from one end in a direction perpendicular to both said first and second rams, means for supporting a filter container in axially aligned relation with the other end of said cored cylinder, and means for actuating said third ram to deliver the tubular mat from said cored cylinder into said container and to compress the tubular mat axially.

6. Apparatus as claimed in claim 5 in which said receptacle means is of rectilinear form, and the dimension thereof in the direction of travel of said second ram is substantially greater than the mean diameter of the tubular mat formed by said cored cylinder.

7. Apparatus as claimed in claim 6 in which said second ram is arranged to operate to deliver the mat into said cored cylinder while said first ram is in mat compressing position.

8. Apparatus as claimed in claim 7 in which said third ram is arranged to operate through said cored open-ended cylinder with said second ram closing said cylinder opening.

9. Apparatus as claimed in claim 8 in which said rams are actuated automatically in sequence.

10. Apparatus as claimed in claim 5 in which said second ram has a stepped surface adapted to engage the edge of the mat formed by said first ram.

11. Apparatus as claimed in claim 5 in which said receptacle is provided with at least one divider to divide same into at least two compartments for the reception of different filtering material, and said first ram is formed to receive said divider in passing through said receptacle.

References Cited in the file of this patent

UNITED STATES PATENTS

| | | |
|---|---|---|
| 2,501,652 | Barrickman | Mar. 28, 1950 |
| 2,540,272 | Malmstrom | Feb. 6, 1951 |